United States Patent
Smith et al.

(10) Patent No.: US 11,244,068 B2
(45) Date of Patent: Feb. 8, 2022

(54) PRIVACY ENFORCEMENT VIA LOCALIZED PERSONALIZATION

(71) Applicant: Intel Corporation, Santa Clara, CA (US)

(72) Inventors: Ned M. Smith, Beaverton, OR (US); Nathan Heldt-Sheller, Portland, OR (US); Thomas G. Willis, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/039,021

(22) PCT Filed: Dec. 24, 2013

(86) PCT No.: PCT/US2013/077653
§ 371 (c)(1),
(2) Date: May 24, 2016

(87) PCT Pub. No.: WO2015/099697
PCT Pub. Date: Jul. 2, 2015

(65) Prior Publication Data
US 2017/0039389 A1    Feb. 9, 2017

(51) Int. Cl.
*G06F 21/62*    (2013.01)
*G06F 17/00*    (2019.01)
(Continued)

(52) U.S. Cl.
CPC .......... *G06F 21/6245* (2013.01); *G06F 17/00* (2013.01); *G06F 21/60* (2013.01);
(Continued)

(58) Field of Classification Search
CPC .............. G06F 21/60–629; G06Q 30/02–0206
See application file for complete search history.

(56) References Cited

U.S. PATENT DOCUMENTS 7,194,424 B2    3/2007    Greer et al.
7,689,672 B2    3/2010    Kanojia et al.
(Continued)

FOREIGN PATENT DOCUMENTS

CN        1848742 A        10/2006
CN      102193794 A         9/2011
(Continued)

OTHER PUBLICATIONS

International Preliminary Report on Patentability and Written Opinion issued in PCT Application No. PCT/US2013/077653, dated Jul. 7, 2016.
(Continued)

*Primary Examiner* — Madhuri R Herzog
(74) *Attorney, Agent, or Firm* — Schwegman Lundberg & Woessner, P.A.

(57) ABSTRACT

This disclosure is directed to privacy enforcement via localized personalization. An example device may comprise at least a user interface to present content. A message may be received into a trusted execution environment (TEE) situated within the device or remotely, the message including at least metadata and content. The TEE may determine relevance of the content to a user based on the metadata and user data. Based on the relevance, the TEE may cause the content to be presented to the user via the user interface. In one embodiment, the TEE may be able to personalize the content based on the user data prior to presentation. If the content includes an offer, the TEE may also be able to present counteroffers to the user based on user interaction with the content. The TEE may also be able to cause feedback data to be transmitted to at least the content provider.

19 Claims, 8 Drawing Sheets

(51) Int. Cl.
*G06F 21/60* (2013.01)
*G06Q 30/02* (2012.01)

(52) U.S. Cl.
CPC ........ *G06F 21/602* (2013.01); *G06F 21/6263* (2013.01); *G06Q 30/02* (2013.01)

(56) References Cited

U.S. PATENT DOCUMENTS

| | | | |
|---|---|---|---|
| 8,396,746 | B1 | 3/2013 | Wang |
| 9,589,149 | B2* | 3/2017 | Livshits .............. G06F 21/6245 |
| 2006/0085263 | A1 | 4/2006 | Greer et al. |
| 2008/0028066 | A1 | 1/2008 | Berkhin et al. |
| 2008/0162693 | A1 | 7/2008 | Kanojia et al. |
| 2008/0177726 | A1 | 7/2008 | Forbes et al. |
| 2008/0222283 | A1 | 9/2008 | Ertugrul et al. |
| 2008/0228767 | A1 | 9/2008 | Kenedy et al. |
| 2009/0187939 | A1* | 7/2009 | Lajoie ................... G06Q 30/02 725/34 |
| 2009/0248496 | A1 | 10/2009 | Hueter et al. |
| 2009/0252325 | A1* | 10/2009 | Reus ..................... H04L 9/0891 380/255 |
| 2010/0024042 | A1 | 1/2010 | Motahar et al. |
| 2010/0293049 | A1* | 11/2010 | Maher .............. G06F 17/30699 705/14.46 |
| 2011/0060649 | A1 | 3/2011 | Dunk et al. |
| 2011/0282964 | A1 | 11/2011 | Krishnaswamy et al. |
| 2011/0289590 | A1 | 11/2011 | Miettinen |
| 2012/0023334 | A1 | 1/2012 | Brickell |
| 2012/0042253 | A1 | 2/2012 | Priyadarshan et al. |
| 2012/0088529 | A1 | 4/2012 | Deutsch et al. |
| 2012/0137224 | A1 | 5/2012 | Carlsen et al. |
| 2012/0158516 | A1 | 6/2012 | Wooten, III et al. |
| 2012/0159540 | A1 | 6/2012 | Park et al. |
| 2012/0239504 | A1 | 9/2012 | Curlander et al. |
| 2013/0007807 | A1 | 1/2013 | Grenville et al. |
| 2013/0086603 | A1* | 4/2013 | Kruger ................ G06F 16/9535 725/14 |
| 2013/0152180 | A1* | 6/2013 | Nair .................... H04L 63/0823 726/6 |
| 2013/0263018 | A1 | 10/2013 | Xiong et al. |
| 2013/0281058 | A1 | 10/2013 | Obaidi et al. |
| 2014/0006140 | A1* | 1/2014 | Pisaris-Henderson ...................... G06Q 30/0242 705/14.41 |
| 2014/0006347 | A1* | 1/2014 | Qureshi ................ H04W 4/029 707/621 |
| 2014/0095867 | A1* | 4/2014 | Smith ................... G06F 21/602 713/164 |
| 2014/0274031 | A1* | 9/2014 | Menendez ........ H04W 52/0209 455/426.1 |

FOREIGN PATENT DOCUMENTS

| | | |
|---|---|---|
| CN | 103369407 | 10/2013 |
| CN | 105765598 | 7/2016 |
| CN | 105765598 | 11/2020 |
| EP | 3087529 | 11/2016 |
| KR | 2005-0014940 A | 2/2005 |
| WO | 2009/127771 A1 | 10/2009 |
| WO | 2011/143625 A2 | 11/2011 |
| WO | 2015099697 | 7/2015 |

OTHER PUBLICATIONS

International Search Report and Written Opinion issued in PCT Application No. PCT/US2013/077653, dated Sep. 26, 2014.
Office Action issued in U.S. Appl. No. 14/035,559, dated Sep. 29, 2016.
Final Office Action issued in U.S. Appl. No. 14/035,559, dated Apr. 21, 2015.
Office Action issued in U.S. Appl. No. 14/035,559, dated Oct. 30, 2014.
Office Action issued in U.S. Appl. No. 13/997,918, dated Aug. 25, 2016.
Final Office Action issued in U.S. Appl. No. 13/997,918, dated Feb. 24, 2015.
Office Action issued in U.S. Appl. No. 13/997,918, dated Aug. 11, 2014.
Notice of Allowance issued in U.S. Appl. No. 13/997,918, dated Apr. 3, 2014.
Notice of Preliminary Rejection dated Jul. 1, 2016 for Korean Application No. 2015-7013352, 13 pages.
International Preliminary Report on Patentability dated Apr. 7, 2016, for PCT Application No. PCT/US2014/053589.
Extended European Search Report dated Jul. 22, 2015 for EP Application No. 12890250.9.
International Preliminary Report on Patentability dated Jul. 2, 2015, for PCT Application No. PCT/US2012/071029.
International Search Report and Written Opinion dated Dec. 11, 2014, for PCT Application No. PCT/US2014/053589.
International Search Report and Written Opinion dated Sep. 27, 2013, for PCT Application No. PCT/US2012/071029.
"Mash Maker—A Paradigm Shift in Web Browsing", 23 pages.
Smith, Ned M.: "Prioritizing Facts for On-line Trust Negotiation", Intel Corporation, Hillsboro, OR, Proceedings of the International Conference on Security and Management, SAM '03, Jun. 23-26, 2003, Las Vegas, NV, USA, vol. 1. CSREA Press 2003 ISBN 1-932415-16-5, 7 pages.
Krawczyk, Hugo: "SIGMA: the 'SIGn-andMAc' Approach to Authenticated Diffe-Hellman and its Use in the IKE Protocols*", Jun. 12, 2003, 32 pages.
Toubiana, Vincent, et al.: "Adnostic: Privacy Preserving Targeted Advertising", accessed from http://crypto.stanford.edu/adnostic/ on Sep. 4, 2013, 16 pages.
Chinese Office Action issued in Chinese Application No. 201380081150.3, dated Feb. 23, 2018, with English machine translation, 33 pages.
Chinese Office Action received in Chinese Patent Application No. 201380081150.3, dated Sep. 14, 2018, 32 pages.
European Office Action received in European Patent Application No. 13900020, dated Mar. 26, 2019, 5 pages.
Chinese Office Action issued in Chinese Application No. 201380081150.3, dated Apr. 2, 2019, with English machine translation, 29 pages.
Chinese Office Action issued in Chinese Application No. 201380081150.3, dated Sep. 2, 2019, with English translation.
"Chinese Application Serial No. 201380081150.3, Response filed Jul. 10, 2018 to Office Action dated Feb. 23, 2018", w o English Translation, 14 pgs.
"Chinese Application Serial No. 201380081150.3, Response filed Jun. 17, 2019 to Office Action dated Apr. 2, 2019", w o English Translation, 14 pgs.
"Chinese Application Serial No. 201380081150.3, Response filed Nov. 29, 2018 to Office Action dated Sep. 14, 2018", w o English Translation, 15 pgs.
"Chinese Application Serial No. 201380081150.3, Response filed Dec. 16, 2019 to Decision on Rejection dated Sep. 2, 2019", w o English Translation, 15 pgs.
"Chinese Application Serial No. 201380081150.3, Office Action dated May 25, 2020", w English Translation, 7 pgs.
"European Application Serial No. 13900020.2, Extended European Search Report dated May 12, 2017", 7 pgs.
"European Application Serial No. 13900020.2, Response filed Nov. 30, 2017 to Extended European Search Report dated May 12, 2017", 19 pgs.
"European Application Serial No. 13900020.2, Response filed Aug. 5, 2019 to Communication Pursuant to Article 94(3) EPC dated Mar. 26, 2019", 10 pgs.
"European Application Serial No. 13900020.2, Intention to Grant dated Oct. 11, 2019", 42 pgs.
"European Application Serial No. 13900020.2, Noting of Loss of Rights dated Mar. 27, 2020", 2 pgs.
"Chinese Application Serial No. 201380081150.3, Response filed Aug. 6, 2020 to Office Action dated May 25, 2020", w English Claims, 17 pgs.

* cited by examiner

FIG. 4

Dimension Matching Example 400

```
<Policy PolicyId="SamplePolicy" RuleCombiningAlgId="urn:oasis:names:tc:xacml:1.0:rule-combining-algorithm:deliver-offer">
<!-- This Policy applies to the public dimension "X" -->
<Target>
    <Subjects>
        <AnySubject/>
    </Subjects>
    <Resources>
        <ResourceMatch MatchId="urn:oasis:names:tc:xacml:1.0:function:string-equal">
            <AttributeValue DataType="http://www.w3.org/2001/XMLSchema#string">Dimension_X_Offers</AttributeValue>
            <ResourceAttributeDesignator DataType="http://www.w3.org/2001/XMLSchema#string"
                AttributeId="urn:oasis:names:tc:xacml:1.0:resource:resource-id"/>
        </ResourceMatch>
    </Resources>
</Target>

<!-- Rule to see if the Subject satisfies private dimension "Y" -->
<Rule RuleId="Dimension_Y_Match" Effect="Display">
    <Target>
        <Subjects>
            <AnySubject/>
        </Subjects>
<!-- This section identifies the display resource -->
        <Resources>
            <AnyResource/>
        </Resources>
        <Actions>
            <ActionMatch MatchId="urn:oasis:names:tc:xacml:1.0:function:string-equal">
                <AttributeValue DataType="http://www.w3.org/2001/XMLSchema#string">Dimension_Y</AttributeValue>
                <ActionAttributeDesignator DataType="http://www.w3.org/2001/XMLSchema#string" AttributeId="DisplayOfferAction"/>
            </ActionMatch>
        </Actions>
    </Target>
</Rule>
</Policy>
```

FIG. 5

Personalization Example 500

```
<!-- Insert title and name into offer if found in local contex -->
<Condition FunctionId="urn:oasis:names:tc:xacml:1.0:function:and">
    <Apply FunctionId="urn:oasis:names:tc:xacml:1.0:function:insert">
        <Apply FunctionId="urn:oasis:names:tc:xacml:1.0:function:find">
            <ContextAttributeSelector DataType="http://www.w3.org/2001/XMLSchema#name_title_prefix"
                AttributeId="urn:oasis:names:tc:xacml:1.0:user-context:current-user"/>
        </Apply>
        <AttributeValue DataType="http://www.w3.org/2001/XMLSchema#offer-impression"
            AttributeId="urn:oasis:names:tc:xamcl:1.0:e-offer:current-offer"/>
        </AttributeValue>
    </Apply>
    <Apply FunctionId="urn:oasis:names:tc:xacml:1.0:function:insert">
        <Apply FunctionId="urn:oasis:names:tc:xacml:1.0:function:find">
            <ContextAttributeSelector DataType="http://www.w3.org/2001/XMLSchema#fullname"
                AttributeId="urn:oasis:names:tc:xacml:1.0:user-context:current-user"/>
        </Apply>
        <AttributeValue DataType="http://www.w3.org/2001/XMLSchema#offe impression"
            AttributeId="urn:oasis:names:tc:xamcl:1.0:e-offer:current-offer"/>
        </AttributeValue>
    </Apply>
</Condition>
```

PRIVACY ENFORCEMENT VIA LOCALIZED PERSONALIZATION

TECHNICAL FIELD

The present disclosure relates to data security, and more particularly, to a scheme for allowing message reception, personalization, interaction, etc. while protecting personal data.

BACKGROUND

Electronic communication has become well-integrated in various aspects of modern society. A user may not simply benefit from being able to access different types of content using various devices at virtually any time, but this convenience may develop into reliance. This level of attention to a particular information source may be attractive to certain content providers. For example, governmental entities may broadcast important information to their constituents, educational institutions may provide information to students and parents, and of course, business concerns may seek to deliver advertisements and similar content to potential consumers. These institutions may not desire to indiscriminately blanket all existing devices with a variety of messages. In addition to the potential to alienate their target audience with a barrage of irrelevant information, the additional traffic flowing through wired and/or wireless communication mediums may cause performance issues that may further enrage the audience they wish to capture. Thus, many content providers attempt to direct their communications to specific parties that may have interest in the content or in products advertised in the content.

In tailoring content delivery to certain audiences, content providers may require some information about the people using these devices. However, users may desire the ability to exercise control over how their personal information is disseminated (e.g., to guard against being overwhelmed by an avalanche of offers, advertisements, etc.). More importantly, as users become more reliant upon their various electronic devices, there is a correspondingly increasing concern about private data getting into the wrong hands. For example, users may store a large amount of private information on their devices including data that identifies the user, where the user lives, where the user works, the user's medical conditions, the user's financial accounts, the user's relatives, friends, etc. The fear of this information possibly being obtained by people having mischievous or even criminal intentions may cause users to resist receiving content that they may otherwise have enjoyed or otherwise benefited from.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIG. 4 illustrates example instructions for dimension matching in accordance with at least one embodiment of the present disclosure;

FIG. 5 illustrates example instructions for content personalization in accordance with at least one embodiment of the present disclosure;

Figure 1:
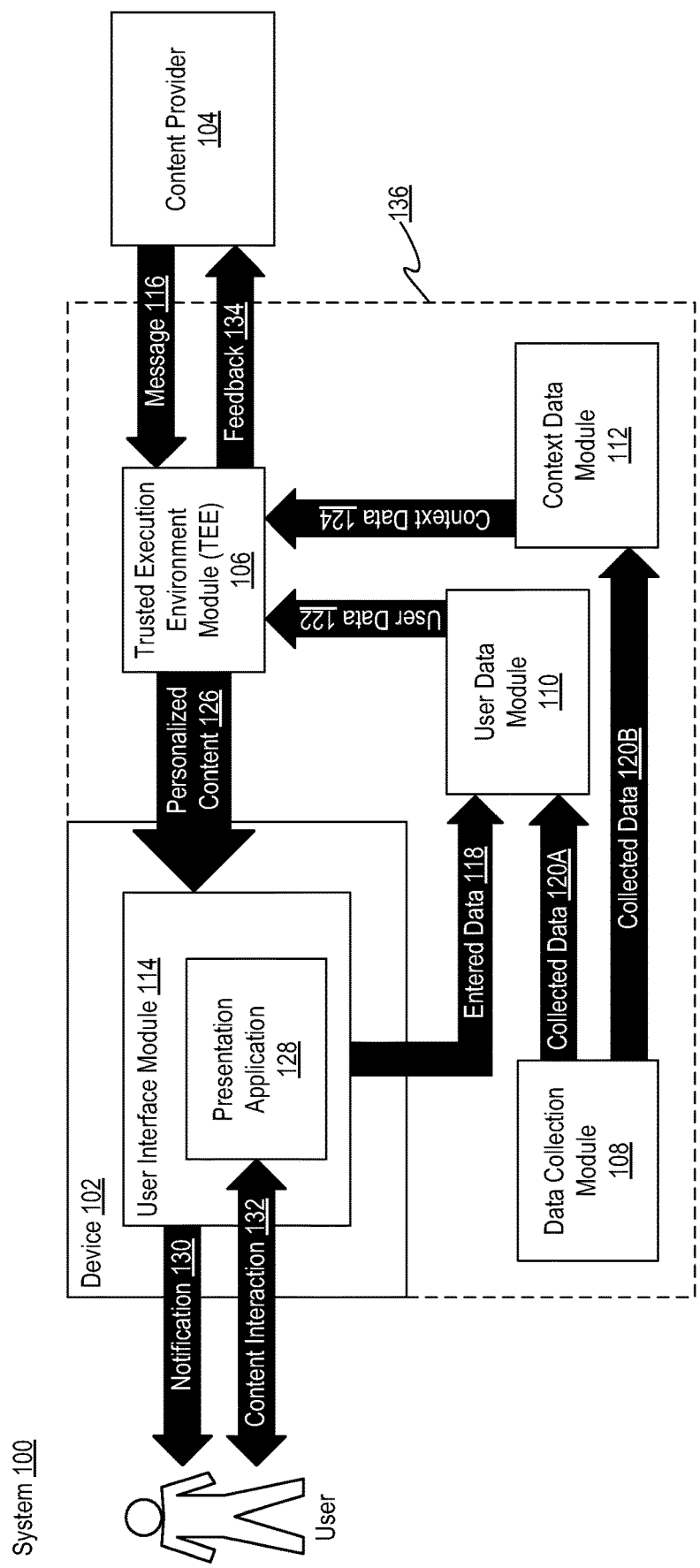
FIG. 1 illustrates an example system configured for privacy enforcement via localized personalization in accordance with at least one embodiment of the present disclosure.

Although the following Detailed Description will proceed with reference being made to illustrative embodiments, many alternatives, modifications and variations thereof will be apparent to those skilled in the art.

DETAILED DESCRIPTION

This disclosure is directed to privacy enforcement via localized personalization. An example device may comprise at least a user interface to present content. A message may be received into a trusted execution environment (TEE) situated within the device or remotely, the message including at least metadata and content. The TEE may determine relevance of the content to a user based on the metadata and user data. Based on the relevance, the TEE may cause the content to be presented to the user via the user interface. In one embodiment, the TEE may be able to personalize the content based on the user data prior to presentation. If the content includes an offer, the TEE may also be able to present counteroffers to the user based on user interaction with the content. The TEE may also be able to cause feedback data to be transmitted to at least the content provider.

In one embodiment, an example device configured for privacy enforcement may comprise at least a communication module, a user interface module and a TEE. The communication module may be to interact with at least a content provider. The user interface module may be to present content to a user. The TEE may be to receive a message from the content provider via the communication module, the message including at least metadata and content, to determine relevance of the content to the user based on at least one of the metadata and user data and to cause the content to be presented to the user via the user interface module based on the relevance of the content.

For example, the TEE may be situated in the device or outside of the device in at least one computing device. The TEE may comprise a secure memory space accessible to only applications verified as safe by the TEE. The metadata may comprise at least public routing data and private criteria. In one example implementation, at least the private criteria are encrypted and the TEE is further to decrypt the private criteria. The private criteria may comprise dimension matching criteria including instructions for determining the relevance of the content. The TEE may further be to personalize the content prior to presentation based on personalization criteria also included in the private criteria, the personalization criteria including instructions for altering the content based on the user data. The TEE may further be to cause additional content to be presented via the user interface module based on counter offer criteria also included in the private criteria, the counter offer criteria including instructions for presenting additional content based on the interaction between the user and the presented content. The private criteria may also comprise feedback criteria including instructions for collecting the feedback data based on at least one of the user data and interaction between the user and the presented content. In this regard, the TEE may further be to cause the feedback data to be collected based on the interaction and cause the feedback data to be transmitted to at least the content provider. The feedback data may comprise, for example, at least privacy protected data resulting from the interaction and sanitized user data, the TEE being further to cause the communication module to transmit the privacy protected data to the content provider and to transmit the sanitized user data to an anonymous data accumulator.

The device may further comprise a data collection module to collect the user data from at least one of user interaction with the device, sensors in the device or data sources outside the device. The TEE may further be to cause the user interface module to present a notification informing the user regarding availability of the content. An example method consistent with embodiments of the present disclosure may comprise receiving a message in a TEE from a content provider, the message including at least metadata and content, determining relevance of the content to a user based on at least one of the metadata and user data and causing the content to be presented to the user based on the relevance of the content.

FIG. 1 illustrates an example system configured for privacy enforcement via localized personalization in accordance with at least one embodiment of the present disclosure. System 100 may comprise, for example, device 102 and content provider 104. Examples of device 102 may include, but are not limited to, a mobile communication device such as a cellular handset or a smartphone based on the Android® OS, iOS®, Windows® OS, Blackberry® OS, Palm® OS, Symbian® OS, etc., a mobile computing device such as a tablet computer like an iPad®, Surface®, Galaxy Tab®, Kindle Fire®, etc., an Ultrabook® including a low-power chipset manufactured by Intel Corporation, a netbook, a notebook, a laptop, a palmtop, etc., a typically stationary computing device such as a desktop computer, a smart television, etc. Content provider 104 may be situated remotely from device 102, and may comprise at least one computing device accessible via a local area network (LAN) or a wide area network (WAN) such as the Internet. An example of content provider 104 may include one or more servers organized in a cloud computing configuration.

System 100 may further comprise, for example, TEE module 106, data collection module 108, user data module 110, context data module 112 and user interface module 114. User interface module 114 may be in device 102 (e.g., content may be presented to a user of device 102 via user interface 114). However, as indicated by dashed line 136, modules 106 to 112 may be flexibly arranged consistent with the present disclosure. For example, while any or all of modules 106 to 112 may be located in device 102, it is also possible for any of these modules to be located remotely from device 102 (e.g., supported by at least one server in a cloud-computing configuration similar to content provider 104. There are advantages to both configurations. Having modules 106 to 112 located within device 102 may improve the security of the data handled by these modules (e.g., there is no need to expose data in cloud-based servers, during transmission to device 102, etc.). However, moving the functionality associated with modules 106 to 112 to a remote device may reduce the data processing load on device 102 and allow for implementation of system 100 using a broader range of devices.

TEE module 106 may be a secure workspace in which known-good programs may execute, confidential information may be stored in a secure manner, etc. In general, TEE module 106 may comprise a set of computing resources that are secure such that programs executing within TEE module 106, and any data associated with the executing programs, are isolated. The programs/data cannot be interfered with or observed during program execution with the exception that the program may be started or stopped and the associated data may be inserted or deleted. The insertion of data may be unobserved, and thus not interfered with, and any data leaving TEE module 106 is released in a controlled manner. Consistent with the present disclosure, at least one known-good program executing within TEE module 106 may perform any or all operations disclosed herein in regard to TEE module 106. In one example implementation, TEE module 106 may utilize Software Guard Extensions (SGX) technology developed by the Intel Corporation. SGX may provide a secure and hardware-encrypted computation and storage area inside of the system memory, the contents of which cannot be deciphered by privileged code or even through the application of hardware probes to memory bus. When TEE module 106 is protected by SGX, embodiments consistent with the present disclosure make it impossible for an intruder to decipher the contents of TEE module 106. Protected data cannot be observed outside of SGX, and thus, is inaccessible outside of SGX.

In an example implementation wherein TEE module 106 resides within SGX, the identity of programs (e.g., based on a cryptographic hash measurement of each program's contents) may be signed and stored inside each program. When the programs are then loaded, the processor verifies that the measurement of the program (e.g., as computed by the processor) is identical to the measurement previously embedded inside the program. The signature used to sign the embedded measurement is also verifiable because the processor is provided with a public key used to verify the signature at program load time. This way malware can't tamper with the program without also altering its verifiable measurement. Malware also cannot spoof the signature because the signing key is secure with the program's author. Thus, the software may not be read, written to or altered by any malware. Moreover, data may also be protected in TEE module 106. For example, known-good programs in TEE module 106 may encrypt data such as keys, passwords, licenses, etc. so that only verified good programs may decrypt this information. While only one TEE module 106 is disclosed in device 102, it is also possible for a plurality of TEE modules 106 to exist. The use of a plurality of TEE modules 106 may increase security in device 102 in that if one TEE module 106 is compromised the security of the remaining separate TEE modules 106 remains intact.

Data collection module 108 may be configured to collect data regarding the status of device 102, a user of device 102, an environment in which the device is operating, etc. This data may be provided by various resources including, but not limited to, data stored within the device, sensors in the device, a LAN or WAN like the Internet, etc. For example, data collection module 108 may collect user data including, but not limited to, data identifying at least one user of device 102, background information regarding the at least one user's gender, age, ethnicity, education, residence, employment, interests, marital status, relations (e.g., relatives, friends, business associates, etc.), clubs, affiliations and any other data that may be used to, for example, target content distributed by content provider 104. Data collection module 108 may also collect data regarding the context of device 102 including device statistics (e.g., utilization, power level, running and/or loaded applications, etc.), environmental information regarding current and/or historical location data for device 102 (e.g., as determined by Global Positioning System (GPS) coordinates, cellular network registration, access points (APs) sensed in proximity to device 102, etc.), other devices sensed in proximity to device 102, etc.

User data module 110 may receive entered data 118 from user interface module 114 (e.g., data manually entered by the user, sensed biometric data, etc.) and collected data 120A from data collection module 108 (e.g., collected from local or remote data sources, sensed by sensors in device 102, etc.). User identification may be important where, for example, there is more than one user for device 102 (e.g., where device 102 may be shared between family members, coworkers, etc.). User data module 110 may process received data 118 and 120A to generate user data 120. Context data module 112 may receive collected data 120B from data collection module 108 (e.g., data pertaining to the current condition of device 102, the environment in which device 102 is operating, etc.). Context data module 112 may process data 120B to generate context data 124. TEE module 106 may utilize user data 122 and/or context data 124 when processing message 116 into personalized content 126. Personalized content may be content delivered to device 102 from content provider 104 via message 116 that has been modified based on user data 122 and/or context data 124. Personalized context 126 may then be provided to user interface module 114 for presentation and/or interaction.

User interface module 114 may be capable of more than one mode of presentation and/or interaction in regard to personalized content 126. In one embodiment, user interface module 114 may present notification 130 to a user of device 102 informing the user that message 116 was received and/or personalized content 126 is available. Notification 130 may be a visible or audible notification to the user, and may be as simple as a small indicator on the display of device 102, a modification to an object already displayed on the display (e.g., superimposing an indicator over an object, changing the appearance of an object, etc.), an audible alert to the user, etc. In one embodiment, Notification 120 may automatically or manually (e.g., via user interaction) cause presentation application 128 to be activated in device 102 or selected for interaction if already active. It may also be possible for notification 120 to be presented on device 102 (e.g., a smart phone or other mobile device), which prompts the user to activate presentation application 128 on another device (e.g., a more powerful device such as tablet computer, laptop computer, etc.). Presentation application 128 may be any program capable of presenting personalized content 126 including, but not limited to, browser applications, multimedia applications, a proprietary viewer associated with content provider 104, etc. The user may then interact with personalized content 126 as shown at 132. Content interaction 132 may comprise, for example, the user reading the content and then interacting with user interface module 114 to answer questions presented by the content, place purchase orders for goods described in the content, receive counteroffers if initially presented offers are declined, etc. TEE 106 may then provide feedback 134 to content provider 104. Feedback 134 may comprise at least the result of content interaction 132 including, for example, the responses of the user to queries in personalized content 126, responses to offers/counteroffers proposed by personalized content 126, metrics regarding the user's interaction with personalized content 126 (e.g., duration of the interaction, sensed biometric information such as user eye focus on personalized content 126, sensed sounds during the interaction, etc.). In one embodiment, feedback 126 may further comprise user data 122 and/or context data 124. This data may be employed by content providers 104 for targeting message 116, for optimizing the content in message 116, etc. Due to privacy and/or safety concerns, the user data 122 and/or context data 124 provided in feedback 134 may be filtered and/or sanitized prior to transmission.

At least one benefit that may be realized from system 100 is the capability for content provider 104 to deliver personalized content 126 to a user of device 102 without placing fear into the user about their personal/confidential data. Since the personalization may occur on the terms of the user (e.g., within the device, within a cloud solution configured by the user), the level of security enforcement is totally within the user's control. Moreover, content provider 104 may also get feedback 134, but again this interaction may be controlled entirely by the user. For example, the user may establish rules dictating what categories of data may be divulged to content provider 104, how much data, how the data is filtered/sanitized, etc.

Figure 2:
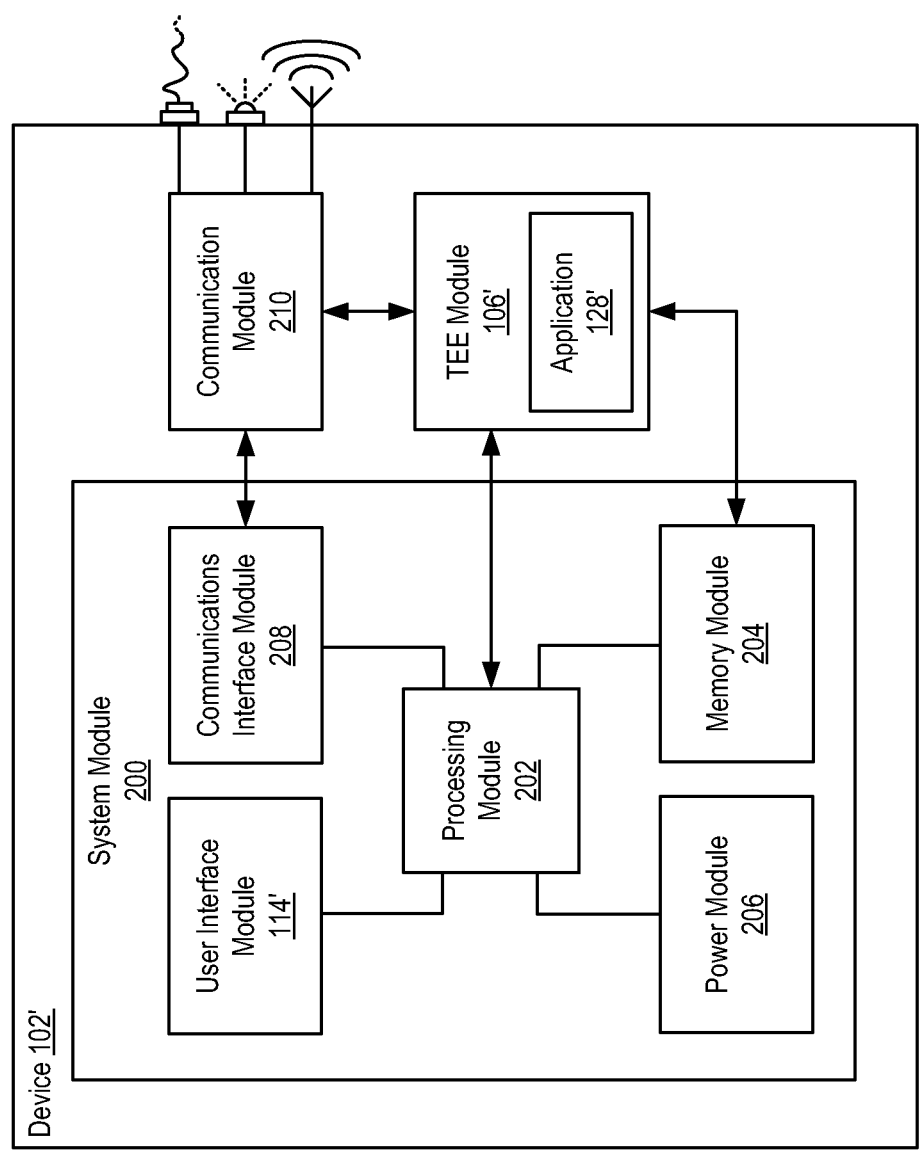
FIG. 2 illustrates an example configuration for a device in accordance with at least one embodiment of the present disclosure.

FIG. 2 illustrates an example configuration for a device in accordance with at least one embodiment of the present disclosure. In particular, device 102' may be able to perform example functionality such as disclosed in FIG. 1. However, device 102' is meant only as an example of equipment usable in embodiments consistent with the present disclosure, and is not meant to limit these various embodiments to any particular manner of implementation.

Device 102' may comprise system module 200 to manage device operations. System module 200 may include, for example, processing module 202, memory module 204, power module 206, user interface module 114' and communication interface module 208. Device 102' may also include at least communication module 210 and TEE module 106'. While communication module 210 and TEE module 106' have been shown separately from system module 200, the example implementation of device 102' has been provided merely for the sake of explanation herein. Some or all of the functionality associated with communication module 210 and/or TEE module 106' may also be incorporated within system module 200.

In device 102', processing module 202 may comprise one or more processors situated in separate components, or alternatively, may comprise one or more processing cores embodied in a single component (e.g., in a System-on-a-Chip (SoC) configuration) and any processor-related support circuitry (e.g., bridging interfaces, etc.). Example processors may include, but are not limited to, various x86-based microprocessors available from the Intel Corporation including those in the Pentium, Xeon, Itanium, Celeron, Atom, Core i-series product families, Advanced RISC (e.g., Reduced Instruction Set Computing) Machine or "ARM" processors, etc. Examples of support circuitry may include chipsets (e.g., Northbridge, Southbridge, etc. available from the Intel Corporation) configured to provide an interface through which processing module 202 may interact with other system components that may be operating at different speeds, on different buses, etc. in device 102'. Some or all of the functionality commonly associated with the support circuitry may also be included in the same physical package as the processor (e.g., such as in the Sandy Bridge family of processors available from the Intel Corporation).

Processing module 202 may be configured to execute various instructions in device 102'. Instructions may include program code configured to cause processing module 202 to perform activities related to reading data, writing data, processing data, formulating data, converting data, transforming data, etc. Information (e.g., instructions, data, etc.) may be stored in memory module 204. Memory module 204 may comprise random access memory (RAM) and/or read-only memory (ROM) in a fixed or removable format. RAM may include memory to hold information during the operation of device 102' such as, for example, static RAM (SRAM) or dynamic RAM (DRAM). ROM may comprise memories utilizing a Basic Input/output System (BIOS) or Unified Extensible Firmware Interface (UEFI) for performing boot operations, programmable memories such as, for example, electronic programmable ROMs (EPROMS), Flash, etc. Memory module 203 may also comprise magnetic memories including, for example, floppy disks, fixed/removable hard drives, etc., electronic memories including, for example, solid state flash memory (e.g., embedded multimedia card (eMMC), etc.), removable cards/sticks (e.g., micro storage devices (uSD), USB, etc.), optical memories including, for example, compact disc ROM (CD-ROM), digital video disc (DVD), etc.

Power module 206 may include internal power sources (e.g., a battery, fuel cell, etc.) and/or external power sources (e.g., electromechanical or solar generation, power grid, etc.), and related circuitry configured to supply device 102' with the energy needed to operate. User interface module 114' may include equipment and/or software to allow users to interact with device 102' such as, for example, various input mechanisms (e.g., microphones, switches, buttons, knobs, keyboards, speakers, touch-sensitive surfaces, one or more sensors configured to capture images, video and/or to sense proximity, distance, motion, gestures, orientation, etc.) and various output mechanisms (e.g., speakers, displays, lighted/flashing indicators, electromechanical components for vibration, motion, etc.). The above example equipment associated with user interface module 114' may be incorporated within device 102' and/or may be coupled to device 102' via a wired or wireless communication medium.

Communication interface module 208 may handle packet routing and other control functions for communication module 210, which may include resources configured to support wired and/or wireless communications. Wired communications may include serial and parallel wired mediums such as, for example, Ethernet, Universal Serial Bus (USB), Firewire, Digital Video Interface (DVI), High-Definition Multimedia Interface (HDMI), etc. Wireless communications may include, for example, close-proximity wireless mediums (e.g., radio frequency (RF) such as based on the Near Field Communications (NFC) standard, infrared (IR), optical character recognition (OCR), magnetic character sensing, etc.), short-range wireless mediums (e.g., Bluetooth, WLAN, Wi-Fi, etc.) and long range wireless mediums (e.g., cellular wide-area radio communication technology, satellite-based communications, etc.). In one embodiment, communication interface module 208 may prevent interference between different active wireless links in communication module 210. In performing this function, communication interface module 208 may schedule activities for communication module 210 based on, for example, the relative priority of messages awaiting transmission.

In the embodiment illustrated in FIG. 2, TEE module 106' may interact with at least processing module 202, memory module 204 and communication module 210. For example, Processing module 202 and/or memory module may perform the operations associated with data collection module 108, user data module 110 and context data module 112. Collected data 120A and B may be processed into user data 122 and/or context data 124 by processing module 202 that may be stored in memory module 204. Message 116 may be received into TEE module 106' via communication module 210, and at least one application 128' in TEE module 106' may generate personalized content 126 by personalizing the content in message 116 based on context data 124 by processing module 202 stored in memory module 204. Personalized content 126 may then be stored in memory module 204 in preparation for presentation to a user of device 102' (e.g., after the user receives notification 130 as to the availability of personalized content 126 triggered, for example by TEE module 106').

Figure 3:
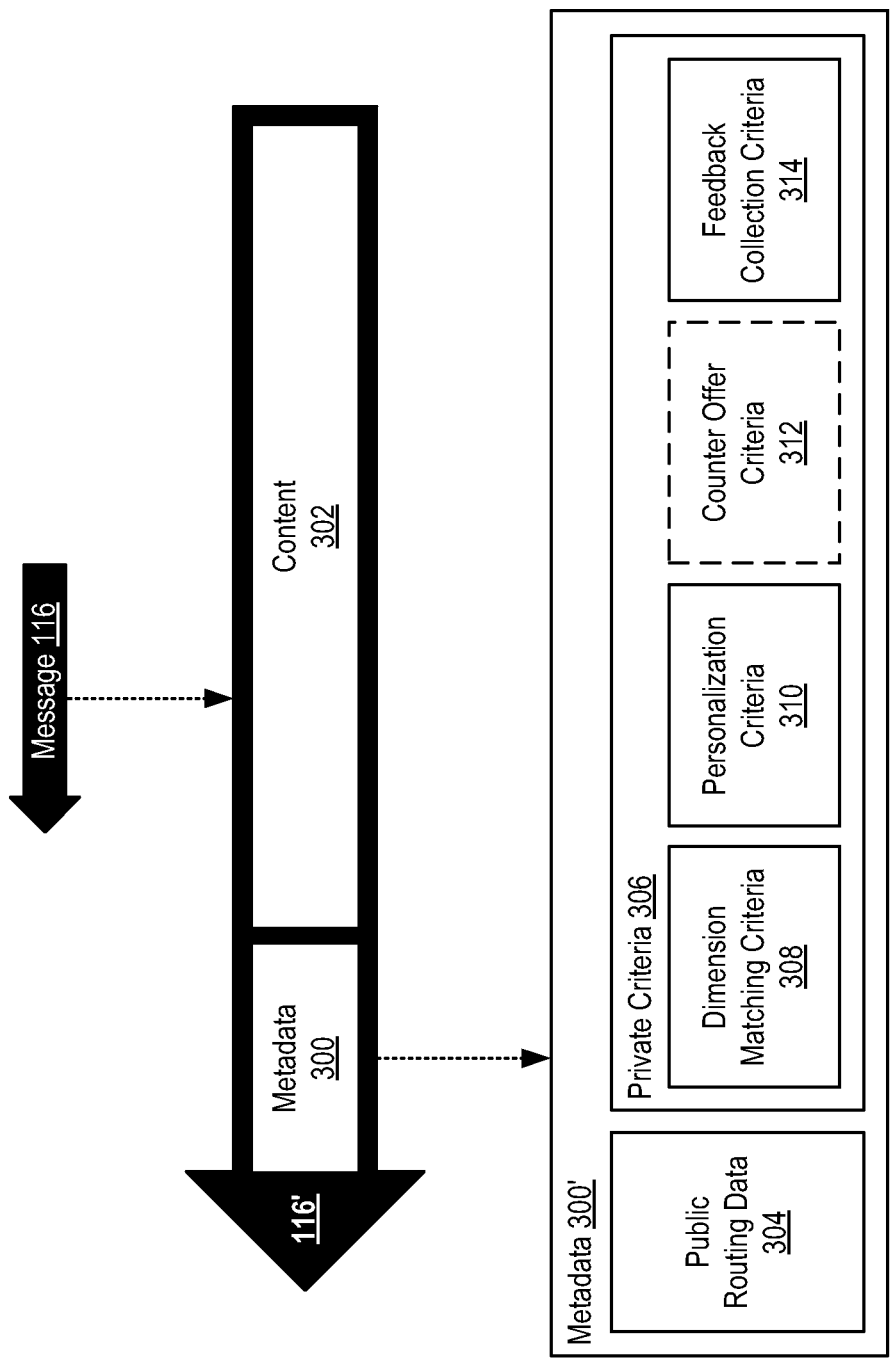
FIG. 3 illustrates an example message in accordance with at least one embodiment of the present disclosure.

FIG. 3 illustrates an example message in accordance with at least one embodiment of the present disclosure. In one embodiment, message 116' may comprise at least metadata 300 and content 302. Content 302 may comprise text, images, video, audio, user interface objects, etc. to be presented to a user of device 102. Metadata 300 may comprise data for routing message 116' and/or data regarding how functionality should be carried out with respect to content 302 and/or collecting data for feedback 134. A more detailed example of metadata 300 is illustrated at 300' in FIG. 3. Public routing data 304 in metadata 300' may comprise general information for getting message 116' to device 102. For example, public routing data 204 may comprise a broad category of devices to receive message 116' such as, for example, a certain type of device, devices communicating on a certain network, devices associated with users in a broad category defined by gender, profession, etc. In practice, it may be beneficial for content provider 104 to allow nothing meaningful to be gained from public routing data 304 in regard to the strategy for disseminating content 302.

In one embodiment, at least some of metadata 300' may be encrypted in a manner that only device 102 may decrypt. Traditionally, TEE module 106 would be required to produce a public key compatible with the key the content provider 104 used to encrypt private criteria 306. This traditional approach has the problem of the public key uniquely identifying device 102 to at least content provider 104 (and likewise the users associated with device 102, which may be undesirable for these users in the instance that content provider 104 is an advertiser or marketer). Moreover, private criteria 306 would have to be customized/re-encrypted for each device 102. Such customization may prove to be a waste of resources as many messages 116 may be filtered out before presentation by TEE module 106' based on public routing data 304.

Alternatively, when TEE module 106 interacts with content provider 104 (and/or with anonymous data accumulator 600 as disclosed in FIG. 6), it may employ an Enhanced Privacy ID (EPID) signed SIGMA (Sign-and Mac) communication session. The EPID signed SIGMA session facilitates anonymous interaction between device 102 and at least content provider 104 during which TEE module 106 may transmit dimension data (e.g., "sanitized" user data devoid of data identifying the corresponding user) and may then receive at least one key for decrypting private criteria 306. The decryption keys may be symmetric (e.g., may be based on the Advanced Encryption Standard (AES), Rivest Cipher 4 (RC4), etc . . . ) or asymmetric public keys wherein the private key may wrap a symmetric public key that is then delivered to TEE module 106. Protecting public keys within private keys is counter to the traditional use of asymmetric public keys for encryption, not decryption. Keeping public keys secret may help to prevent Man-In-The-Middle (MITM) attacks from intercepting the public keys.

Private criteria 306 may be encrypted to, for example, prevent competitors of content provider 104 from determining proprietary information with respect to their strategy for disseminating content 302. For example, content provider 104 may market products to the user of device 102, and a strategy for marketing these products may be readily determinable from private criteria 306. Thus, content provider 104 may only participate in system 100 if there is some assurance that their marketing strategy is kept secret. The data in private criteria 306 may perform a variety of functionality, examples of which are presented in FIG. 3. For example, dimension matching criteria 308 may further expand upon the broad categories defined in public routing data 304 to determine if content 302 is applicable to the current user of device 102. Dimension matching criteria 308 may include instructions, rules, etc. that further refine whether content 302 should be presented to the current user of device 102. Example code (e.g., a set of instructions) that may be included in dimension matching criteria 308 is disclosed in FIG. 4. Dimension matching example 400 is written in Extensible Access Control Markup Language (XACML), but may also be composed using other basic encoding rules (BER) depending upon, for example, the requirements/characteristics of the particular implementation. Examples of other BERs may include JavaScript Object Notation (JSON), Abstract Syntax Notation One (ASN.1), etc. Example 400 defines an example policy (e.g., a user is within a certain age range, has a certain level of education, already uses a certain product, has a certain familial makeup, has manually configured user preferences in device 102 to allow content 302 to be presented, etc.) and may then query whether the current user of the device satisfies this policy (e.g., based on user data 110 and/or context data 112). If the current user of the device fits within the polices defined in dimension matching criteria 308, then a determination may be made that the presentation of content 302 is appropriate.

If it is determined that content 302 is appropriate for the current user of device 102 based on dimension matching criteria 308, then personalization criteria 310 may describe how to personalize content 302 for the current user of device 102 (e.g., based on user data 110, context data 112, etc.). For example, personalization criteria 310 may define areas of content 302 that may be altered to reflect the user, the perspective of the user, the location of the device/user, etc. Example code corresponding to functionality that may be performed by personalization criteria 310 is disclosed in FIG. 5. Personalization example 500 comprises example XACML code to insert the title (e.g., Mr., Ms., Mrs., etc.) and the name of the user of device 102 into content 302. In this manner, content 302 may appeal more to the current user, which may help to better maintain the attention of the user of device 102.

Counter offer criteria 312 may be optional in private criteria 306 in that is may only be required in certain scenarios (e.g., when content 302 comprises an advertisement including at least one offer to which the user of device 102 may respond). Counter offer criteria 312 may comprise at least one other offer that may be presented to the user if an offer included in content 302 is declined, not of interest to the user, etc. Counter offer criteria 314 may present counter offers to the user automatically (e.g., after an initial offer is declined during content interaction 132). The number, type, etc. of counter offers available to a user may depend on the particular implementation of system 100. Regardless of whether an offer or counter offer is accepted by the user, feedback criteria module 314 may include instructions as to how to generate feedback 134. In one embodiment, feedback 134 may comprise data derived from content interaction 132, which may then be transmitted back to content provider 104. Data in feedback 134 may comprise the identification of the user, user answers to questions posed during content interaction 132, user acceptance/refusal information regarding offers made during content interaction 132, user payment/delivery information if an offer was accepted, etc. In the same or a different embodiment, feedback 134 may also comprise user data 110 and/or context data 112 for use by content provider 104 for determining the attractiveness, effectiveness, etc. of content 302. A more detailed example disclosing how feedback 134 may be provided to ensure that the privacy of the user is protected is disclosed in FIG. 6.

Figure 6:
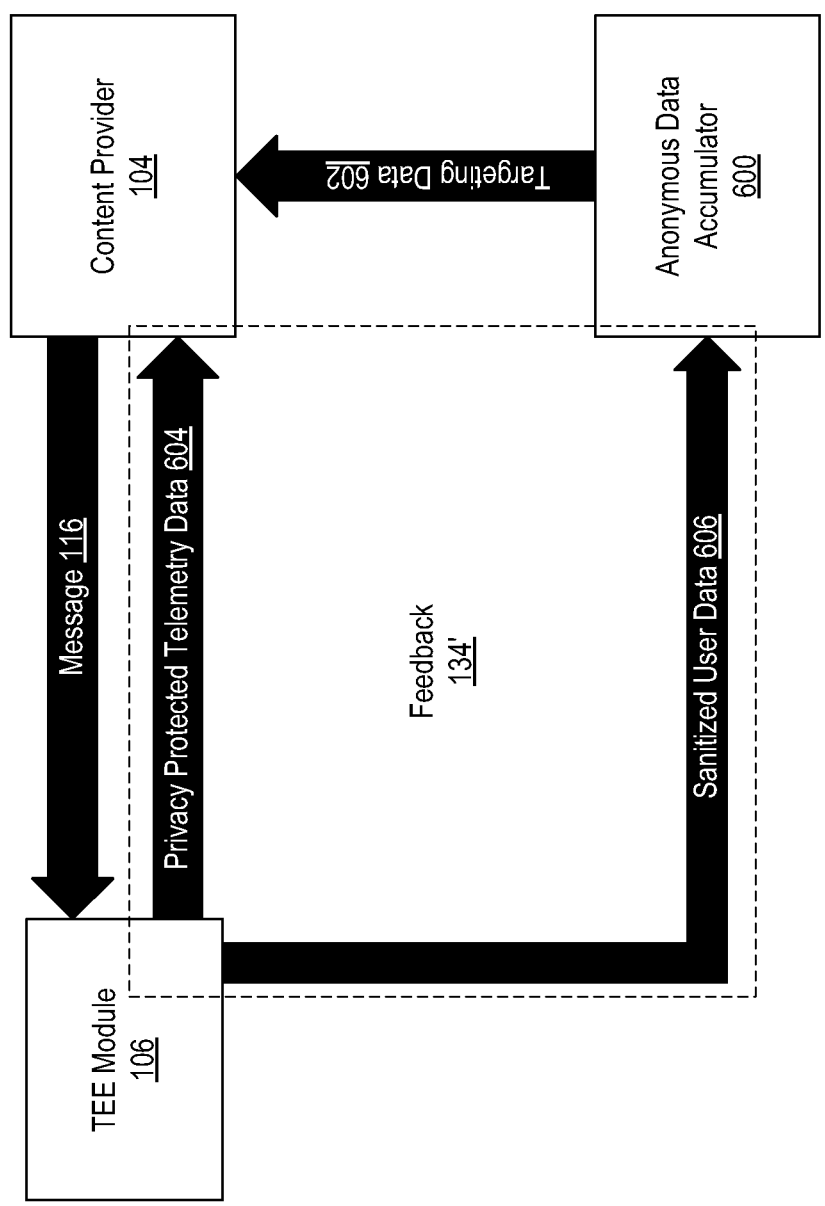
FIG. 6 illustrates example feedback in accordance with at least one embodiment of the present disclosure.

FIG. 6 illustrates example feedback in accordance with at least one embodiment of the present disclosure. In one embodiment, feedback 134' may be provided to different entities that participate in the content creation process. Anonymous data accumulator 600 may be part of content provider 104 or may be a totally independent entity. Anonymous data accumulator 600 may comprise at least one computing device (e.g., a server) accessible via a LAN or WAN like the Internet (e.g., in a cloud-computing configuration) to accumulate data from a variety of devices 102. Anonymous data accumulator 600 may process the collected data to determine statistics, distributions, trends, etc. within the data, and may then provide the processed data (e.g., targeting data 602) to content provider 104. Content provider 104 may utilize targeting data 602 to, for example, improve existing content 302, to generate new content 302, etc.

Given the example presented in FIG. 4, feedback 134' may comprise at least two data flows. Privacy protected telemetry data 604 may include, for example, the results of content interaction 132. It may be important to deliver this information directly to content provider 104 as it may contain offer acceptance information regarding an offer (or counter offer) that was presented in content 302. Privacy protected telemetry data 604 may be filtered by TEE module 106 prior to transmission to ensure only necessary data is being provided to content provider 104. Filtering in TEE module 106 may help to ensure that any data intended to be kept private by the user is filtered in a safe environment (e.g., not susceptible to compromise from other programs, outside influences, etc.) prior to privacy protected telemetry data 604 being sent. Alternatively, privacy protected telemetry data 604 may be delivered to content provider 104 via an anonymous interaction protocol such as an EPID signed SIGMA session as described above with respect to FIG. 3. Sanitized user data 606 may comprise user data 110 and/or context data 112 (e.g., user gender, age, location, familial makeup, profession, interests, etc.) that may be provided to anonymous data accumulator 600 in a similar manner to privacy protected telemetry data 604 in that TEE module 106 may remove private/confidential data prior to transmission or via an anonymous interaction protocol. In one embodiment, the rules for determining the data that may be transmitted in privacy protected telemetry data 604 and/or sanitized user data 606 may be set by the manufacturer of device 102, may be configured by users of device 102 (e.g., via user interface module 114), etc.

Figure 7:
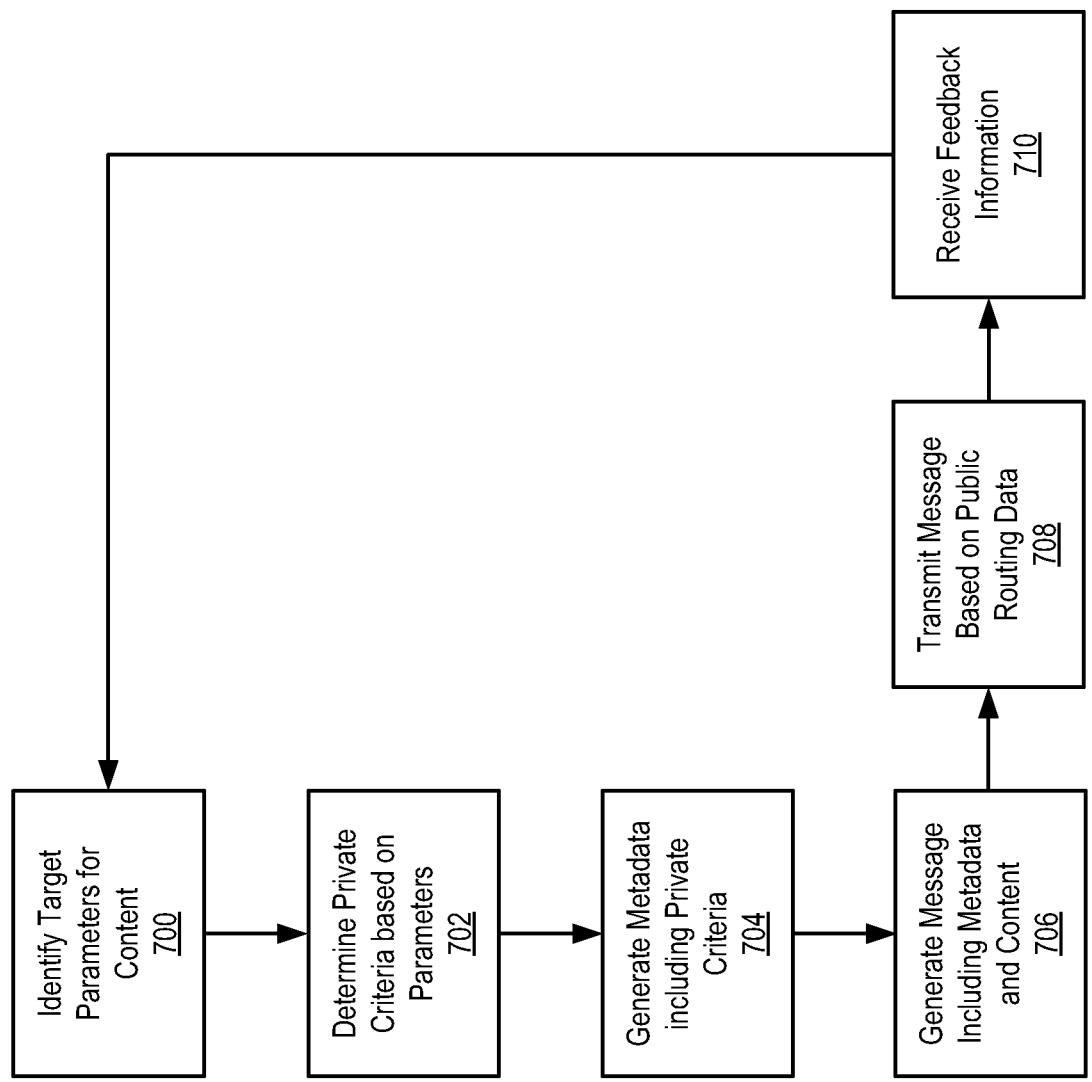
FIG. 7 illustrates example operations for message generation and feedback reception in accordance with at least one embodiment of the present disclosure.

FIG. 7 illustrates example operations for message generation and feedback reception in accordance with at least one embodiment of the present disclosure. The operations shown in FIG. 7 may be performed by, for example, a content provider. In operation 700 the content provider may identify target parameter for content (e.g., to be transmitted to target users in a message). Private criteria may then be determined based at least on the target parameters in operation 702. Private criteria may include instructions that, in view of the strategy of the content provider, determine whether to present the content to a user, customize the content, present counter offers, collect data etc. The content provider may then proceed to generate metadata based at least on the private criteria in operation 704. The metadata generated in operation 704 may be combined with the content to generate a message in operation 706 that may then be transmitted in operation 708 (e.g., based on public routing data included in the message. Feedback may then be received in operation 710 (e.g., from the devices to which the message was transmitted, for a separate entity such as an anonymous data accumulator that collects feedback from the devices, etc.).

Figure 8:
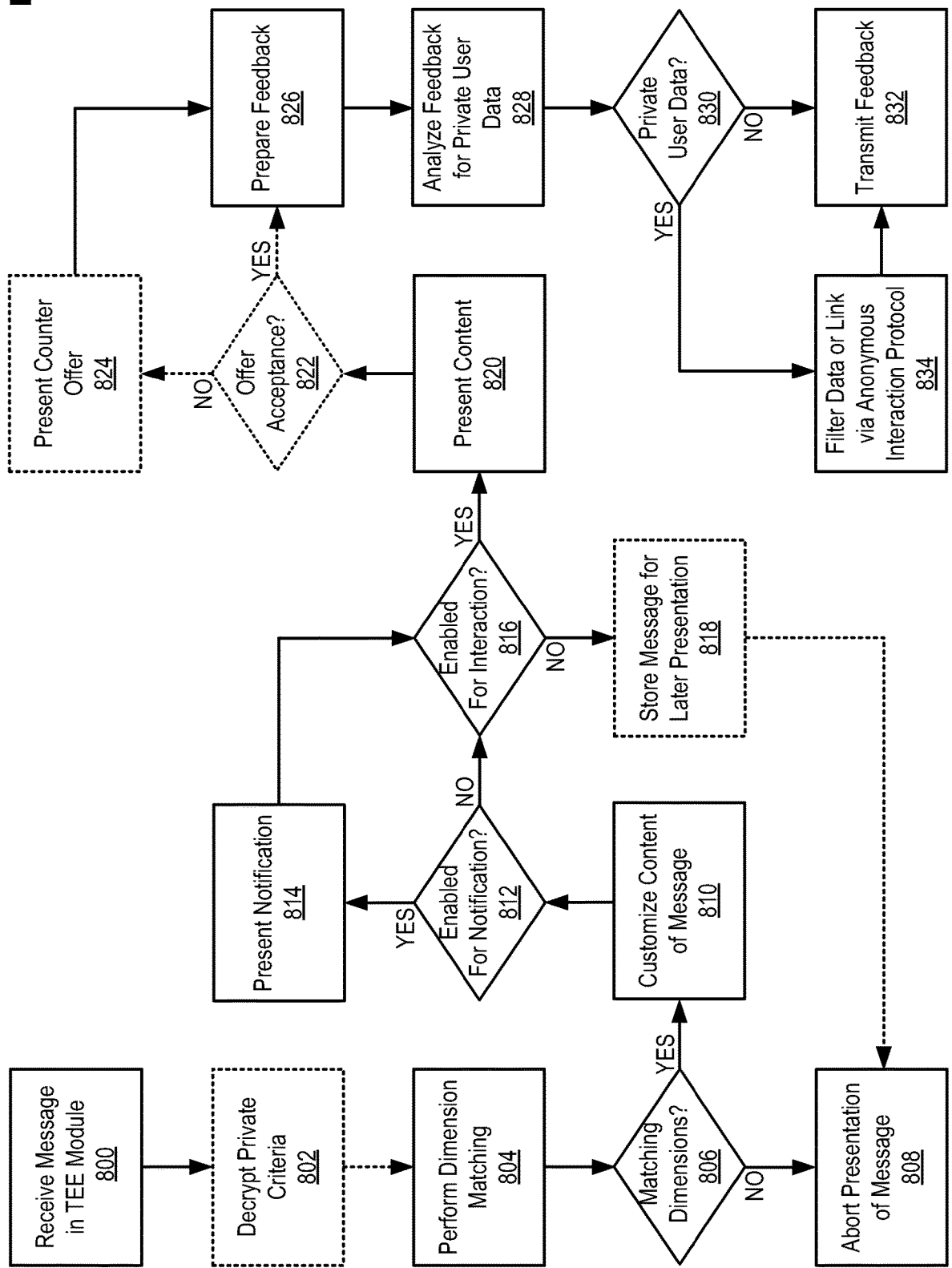
FIG. 8 illustrates example operations for privacy enforcement via localized personalization in accordance with at least one embodiment of the present disclosure.

FIG. 8 illustrates example operations for privacy enforcement via localized personalization in accordance with at least one embodiment of the present disclosure. The operations shown in FIG. 8 may be performed by, for example, devices that receive messages from content providers, at least one computing device accessible via a LAN or WAN like the Internet (e.g., in a cloud-computing configuration), etc. A message may be received in a TEE module in operation 800 and any private data in the message may be decrypted in operation 802 (e.g., operation 802 may only be necessary if the message includes encrypted private criteria). In operation 804 dimension matching may be performed to determine if content in the message should be presented to the user (e.g., based on at least one policy encoded within the private criteria). A determination may be made in operation 806 as to whether dimension matching was achieved between the user and the content. If in operation 806 it is determined that the dimension matching failed, then in operation 808 presentation of the content may be aborted.

If in operation 806 it is determined that dimension matching was successful (e.g., that the content should be presented), then in operation 810 the content may be customized based on at least one of user data or context data. A determination may then be made in operation 812 as to whether the device of the user is enabled for notification regarding the availability of the content. If it is determined in operation 812 that content notification is enabled, then in operation 814 the notification may be presented on the device. A determination in operation 812 that content notification is not enabled in the device or operation 814 may be followed by operation 816 wherein a determination may be made as to whether the device is enabled for user interaction with the content. If it is determined that the device is not enabled for user interaction with the content (e.g., an application for interacting with the content is not active or may not be installed), then in operation 818 the content may optionally be stored for later presentation (e.g., if the device supports this functionality) and presentation of the content may be aborted in operation 808. If in operation 816 it is determined that the device is enabled for user interaction with the content, then the content may be presented to the user in operation 820 (e.g., via a user interface in the device).

Operations 822 to 824 in FIG. 8 may be optional as they may only be applicable when the content presented to the user in operation 820 comprises an offer. In operation 822 a determination may be made as to whether an offer presented in the content is accepted by the user. If it is determined in operation 822 that the offer was not accepted by the user, then in operation 824 any counter offers included in the message may then be presented to the user. A determination in operation 822 that the offer was accepted or operation 824 may then be followed by operation 826 wherein feedback may be prepared for transmission to at least the content provider (e.g., and possibly other entities such as an anonymous data accumulator, etc.). Feedback may include, for example, the results of the user interaction with the content, data about the user, about the context of the user/device, etc. In operation 828 the feedback may be analyzed by the TEE module to determine if any user data in the feedback is private and/or confidential. A determination may then be made in operation 830 as to whether the feedback comprises private and/or confidential user data. If in operation 830 it is determined that the feedback comprises private and/or confidential user data, then in operation 834 the feedback may be filtered and/or sanitized to remove private and/or confidential user data. In instances where the feedback includes a large amount of data, an alternative option may be to establish a communication session that links the TEE module to the content provider, the target data accumulator, etc. via an anonymous interaction protocol such as an EPID signed SIGMA communication session that allows data to be transmitted without identifying the source of the data. A determination in operation 830 that the feedback does not comprise private and/or confidential information or operation 834 may be followed by transmission of the feedback in operation 832.

While FIGS. 7 and 8 illustrate operations according to different embodiments, it is to be understood that not all of the operations depicted in FIGS. 7 and 8 are necessary for other embodiments. Indeed, it is fully contemplated herein that in other embodiments of the present disclosure, the operations depicted in FIGS. 7 and 8, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the term "module" may refer to software, firmware and/or circuitry configured to perform any of the aforementioned operations. Software may be embodied as a software package, code, instructions, instruction sets and/or data recorded on non-transitory computer readable storage mediums. Firmware may be embodied as code, instructions or instruction sets and/or data that are hard-coded (e.g., nonvolatile) in memory devices. "Circuitry", as used in any embodiment herein, may comprise, for example, singly or in any combination, hardwired circuitry, programmable circuitry such as computer processors comprising one or more individual instruction processing cores, state machine circuitry, and/or firmware that stores instructions executed by programmable circuitry. The modules may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more storage mediums (e.g., non-transitory storage mediums) having stored thereon, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software modules executed by a programmable control device.

Thus, this disclosure is directed to privacy enforcement via localized personalization. An example device may comprise at least a user interface to present content. A message may be received into a trusted execution environment (TEE) situated within the device or remotely, the message including at least metadata and content. The TEE may determine relevance of the content to a user based on the metadata and user data. Based on the relevance, the TEE may cause the content to be presented to the user via the user interface. In one embodiment, the TEE may be able to personalize the content based on the user data prior to presentation. If the content includes an offer, the TEE may also be able to present counteroffers to the user based on user interaction with the content. The TEE may also be able to cause feedback data to be transmitted to at least the content provider.

The following examples pertain to further embodiments. The following examples of the present disclosure may comprise subject material such as a device, a method, at least one machine-readable medium for storing instructions that when executed cause a machine to perform acts based on the method, means for performing acts based on the method and/or a system for privacy enforcement via localized personalization, as provided below.

Example 1

According to this example there is provided a device for privacy enforcement. The device may comprise at least a communication module to interact with a content provider, a user interface module to present content to a user and a trusted execution environment (TEE) to receive a message from the content provider via the communication module, the message including at least metadata and content, determine relevance of the content to the user based on at least one of the metadata and user data and cause the content to be presented to the user via the user interface module based on the relevance of the content.

Example 2

This example includes the elements of example 1, wherein the TEE is situated in the device or outside of the device in at least one computing device.

Example 3

This example includes the elements of any of examples 1 to 2, wherein the TEE comprises a secure memory space accessible to only applications verified as safe by the TEE.

Example 4

This example includes the elements of any of examples 1 to 2, wherein the metadata comprises at least public routing data and private criteria.

Example 5

This example includes the elements of example 4, wherein at least the private criteria are encrypted and the TEE is further to decrypt the private criteria.

Example 6

This example includes the elements of example 4, wherein the private criteria are formulated using basic encoding rules including at least one of Extensible Access Control Markup Language (XACML), JavaScript Object Notation (JSON) or Abstract Syntax Notation One (ASN.1).

Example 7

This example includes the elements of example 4, wherein the private criteria comprises dimension matching criteria including instructions for determining the relevance of the content.

Example 8

This example includes the elements of example 7, wherein the dimension matching criteria comprises considering any user preferences regarding the presentation of content that are configured in the device.

Example 9

This example includes the elements of example 4, wherein the TEE is further to personalize the content prior to presentation based on personalization criteria included in the private criteria, the personalization criteria including instructions for altering the content based on the user data.

Example 10

This example includes the elements of example 4, wherein the TEE is further to cause additional content to be presented via the user interface module based on counter offer criteria included in the private criteria, the counter offer criteria including instructions for presenting additional content based on the interaction between the user and the presented content.

Example 11

This example includes the elements of example 4, wherein the private criteria comprises feedback criteria including instructions for collecting the feedback data based on at least one of the user data and interaction between the user and the presented content.

Example 12

This example includes the elements of example 11, wherein the TEE is further to cause the feedback data to be collected based on the interaction and to cause the feedback data to be transmitted to at least the content provider.

Example 13

This example includes the elements of example 11, wherein the feedback data comprises at least privacy protected data resulting from the interaction and sanitized user data, the TEE being further to cause the communication module to transmit the privacy protected data to the content provider and to transmit the sanitized user data to an anonymous data accumulator.

Example 14

This example includes the elements of example 13, wherein at least one of the privacy protected data or the sanitized user data may be transmitted using an anonymous interaction protocol.

Example 15

This example includes the elements of any of examples 1 to 2, further comprising a data collection module to collect the user data from at least one of user interaction with the device, sensors in the device or data sources outside of the device.

Example 16

This example includes the elements of any of examples 1 to 2, wherein the TEE is further to cause the user interface module to present a notification informing the user regarding availability of the content.

Example 17

This example includes the elements of example 16, wherein the notification is at least one of an indicator or icon displayed on the device or a sound generated by the device.

Example 18

This example includes the elements of any of examples 1 to 2, wherein the TEE module is further to cause the message to be stored for later presentation by the device.

Example 19

This example includes the elements of any of examples 1 to 2, wherein the metadata comprises at least public routing data and encrypted private criteria, the TEE being further to decrypted the private criteria.

Example 20

This example includes the elements of example 19, wherein the private criteria comprises feedback criteria including instructions for collecting the feedback data based on at least one of the user data and interaction between the user and the presented content, the TEE being further to cause the feedback data to be collected based on the interaction and to cause the feedback data to be transmitted to at least the content provider.

Example 21

According to this example there is provided a method for privacy enforcement. The method may comprise receiving a message in a trusted execution environment (TEE) from a content provider, the message including at least metadata and content, determining relevance of the content to a user based on at least one of the metadata and user data and causing the content to be presented to the user based on the relevance of the content.

Example 22

This example includes the elements of example 21, wherein the metadata comprises at least public routing data and private criteria.

Example 23

This example includes the elements of example 22, wherein at least the private criteria are encrypted and the method further comprises decrypting the private criteria.

Example 24

This example includes the elements of example 23, wherein the private criteria are formulated using basic encoding rules including at least one of Extensible Access Control Markup Language (XACML), JavaScript Object Notation (JSON) or Abstract Syntax Notation One (ASN.1).

Example 25

This example includes the elements of any of examples 22 to 24, wherein the private criteria comprises dimension matching criteria including instructions for determining the relevance of the content.

Example 26

This example includes the elements of example 25, wherein the dimension matching criteria comprises considering any user preferences regarding the presentation of content that are configured in the device.

Example 27

This example includes the elements of any of examples 22 to 24, and further comprises personalizing the content prior to presentation based on personalization criteria included in the private criteria, the personalization criteria including instructions for altering the content based on the user data.

Example 28

This example includes the elements of any of examples 22 to 24, and further comprises causing additional content to be presented based on counter offer criteria included in the private criteria, the counter offer criteria including instructions for presenting additional content based on the interaction between the user and the presented content.

Example 29

This example includes the elements of any of examples 22 to 24, wherein the private criteria comprises feedback criteria including instructions for collecting feedback data based on at least one of the user data and interaction between the user and the presented content.

Example 30

This example includes the elements of example 29, and further comprises causing the feedback data to be collected based on the interaction and causing the feedback data to be transmitted to at least the content provider.

Example 31

This example includes the elements of example 29, wherein the feedback data comprises at least privacy protected data resulting from the interaction and sanitized user data, the method further comprising causing the privacy protected data to be transmitted to the content provider and the sanitized user data to be transmitted to an anonymous data accumulator.

Example 32

This example includes the elements of example 31, wherein at least one of the privacy protected data or the sanitized user data may be transmitted using an anonymous interaction protocol.

Example 33

This example includes the elements of any of examples 21 to 24, and further comprises collecting the user data from at least one of user interaction, sensors or data sources outside the device.

Example 34

This example includes the elements of any of examples 21 to 24, and further comprises causing a notification informing the user regarding availability of the content to be presented.

Example 35

This example includes the elements of example 34, wherein the notification is at least one of an indicator or icon displayed on the device or a sound generated by the device.

Example 36

This example includes the elements of any of examples 21 to 24, wherein the metadata comprises at least public routing data and encrypted private criteria, the method further comprising decrypting the private criteria.

Example 37

This example includes the elements of example 36, wherein the private criteria comprises feedback criteria including instructions for collecting feedback data based on at least one of the user data and interaction between the user and the presented content, the method further comprising causing the feedback data to be collected based on the interaction; and causing the feedback data to be transmitted to at least the content provider.

Example 38

According to this example there is provided a system including at least one device, the system being arranged to perform the method of any of the above examples 21 to 37.

Example 39

According to this example there is provided a chip set arranged to perform the method of any of the above examples 21 to 37.

Example 40

According to this example there is provided at least one machine readable medium comprising a plurality of instructions that, in response to be being executed on a computing device, cause the computing device to carry out the method according to any of the above examples 21 to 37.

Example 41

According to this example there is provided at least one device configured for privacy enforcement via localized personalization, the device being arranged to perform the method of any of the above examples 21 to 37.

Example 42

According to this example there is provided a system for privacy enforcement. The system may comprise means for receiving a message in a trusted execution environment (TEE) from a content provider, the message including at least metadata and content, means for determining relevance of the content to a user based on at least one of the metadata and user data and means for causing the content to be presented to the user based on the relevance of the content.

Example 43

This example includes the elements of example 42, wherein the metadata comprises at least public routing data and encrypted private criteria, the method further comprising decrypting the private criteria.

Example 44

This example includes the elements of example 43, wherein the private criteria comprises dimension matching criteria including instructions for determining the relevance of the content.

Example 45

This example includes the elements of any of examples 43 to 44, and further comprises means for personalizing the content prior to presentation based on personalization criteria included in the private criteria, the personalization criteria including instructions for altering the content based on the user data.

Example 46

This example includes the elements of any of examples 43 to 44, and further comprises means for causing additional content to be presented based on counter offer criteria included in the private criteria, the counter offer criteria including instructions for presenting additional content based on the interaction between the user and the presented content.

Example 47

This example includes the elements of any of examples 43 to 44, wherein the private criteria comprises feedback criteria including instructions for collecting feedback data based on at least one of the user data and interaction between the user and the presented content, the system further comprising means for causing the feedback data to be collected based on the interaction and means for causing the feedback data to be transmitted to at least the content provider.

Example 48

This example includes the elements of example 47, wherein the feedback data comprises at least privacy protected data resulting from the interaction and sanitized user data, the system further comprising means for causing the privacy protected data to be transmitted to the content provider and the sanitized user data to be transmitted to an anonymous data accumulator.

Example 49

This example includes the elements of example 42, and further comprises means for causing a notification informing the user regarding availability of the content to be presented.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A device configured for privacy enforcement, comprising:
   communication circuitry to receive messages from content providers;
   user interface circuitry to present content to a user; and
   a trusted execution environment (TEE) comprising secured memory circuitry and secured processing circuitry, the TEE being to:
     establish an enhanced privacy identifier signed signature and media access control session between the TEE and a content provider using the communication circuitry;
     receive a message from the content provider, wherein the message is received using the enhanced privacy identifier signed signature and media access control session;
     verify that an application to be executed using the TEE is safe to access the secure memory circuitry within the TEE based on a verification of a cryptographic hash measurement of the application and a verification of a signature used to sign the cryptographic hash measurement;
     in response to verification that the application is safe to access the secure memory circuitry, execute the application to sanitize first user data to de-identify or uncorrelate the first user data from the user, prior to transmission of the first user data to the content provider;
     transfer the message received from the content provider via the communication circuitry to the secured memory circuitry, the message including content and further including metadata comprising public routing data and encrypted private criteria, wherein the encrypted private criteria include criteria for matching content to the user based on second user data that is not shared external to the TEE;
     decrypt the encrypted private criteria via the secured processing circuitry;
     determine, via the secured processing circuitry and based at least in part on one or more of the decrypted private criteria and second user data previously stored via the secured memory circuitry, relevance of the content to the user;
     personalize the content based on personalization criteria included in at least a portion of the second user data previously stored via the secured memory circuitry; and
     cause the personalized content to be presented to the user via the user interface circuitry based on the determined relevance.

2. The device of claim 1, wherein the private criteria comprises dimension matching criteria including instructions for determining the relevance of the content.

3. The device of claim 1, wherein the TEE is further to cause additional content, to be presented via the user interface circuitry based on counter offer criteria included in the private criteria, the counter offer criteria including instructions for presenting additional content based on the interaction between the user and the presented content.

4. The device of claim 1, wherein the private criteria comprises feedback criteria including instructions for collecting the feedback data based on at least one of the first user data and interaction between the user and the presented content, the TEE being further to:
   cause the feedback data to be collected based on the interaction; and
   cause the feedback data to be transmitted to at least the content provider.

5. The device of claim 4, wherein the feedback data comprises at least privacy protected data resulting from the interaction and sanitized user data, the TEE being further to cause the communication circuitry to transmit the privacy protected data to the content, provider and to transmit the sanitized user data to an anonymous data accumulator.

6. The device of claim 1, further comprising data collection circuitry to collect the first user data from at least one of user interaction with the device, sensors in the device or data sources outside of the device.

7. The device of claim 1, wherein the TEE is further to cause the user interface circuitry to present a notification informing the user regarding availability of the content.

8. A method for privacy enforcement, comprising:
   establishing an enhanced privacy identifier signed signature and media access control session between a trusted execution environment (TEE) and a content provider using communication circuitry;
   receiving a message in the TEE from a content provider using the enhanced privacy identifier signed signature and media access control session, the TEE including secured memory circuitry and secured processing circuitry, and the message including content and further including metadata comprising public routing data and encrypted private criteria;

verifying by the TEE that an application to be executed using the TEE is safe to access the secure memory circuitry within the TEE based on a verification of a cryptographic hash measurement of the application and a verification of a signature used to sign the cryptographic hash measurement;

in response to verification that the application is safe to access the secure memory circuitry, executing the application to sanitize first user data to de-identify or uncorrelate the first user data from the user, prior to transmission of the first user data to the content provider;

transferring the received message to the secured memory circuitry of the TEE, wherein the encrypted private criteria include criteria for matching content to the user based on second user data that is not shared external to the TEE;

decrypting the encrypted private criteria via the secured processing circuitry of the TEE;

determining, via the secured processing circuitry and based at least in part on one or more of the decrypted private criteria and second user data previously stored via the secured memory circuitry, relevance of the content to a user associated with the user data;

personalizing the content based on personalization criteria included in at least a portion of the second user data previously stored in the secured memory circuitry of the TEE; and causing the personalized content to be presented to the user based on the determined relevance.

9. The method of claim 8, wherein the private criteria comprises dimension matching criteria including instructions for determining the relevance of the content.

10. The method of claim 8, further comprising:
causing additional content to be presented based on counter offer criteria included in the private criteria, the counter offer criteria including instructions for presenting additional content based on the interaction between the user and the presented content.

11. The method of claim 8, wherein the private criteria comprises feedback criteria including instructions for collecting feedback data based on at least one of the first user data and interaction between the user and the presented content, the method further comprising:
causing the feedback data to be collected based on the interaction; and
causing the feedback data to be transmitted to at least the content provider.

12. The method of claim 11, wherein the feedback data comprises at least privacy protected data resulting from the interaction and sanitized user data, the method further comprising causing the privacy protected data to be transmitted to the content provider and the sanitized user data to be transmitted to an anonymous data accumulator.

13. The method of claim 8, further comprising:
causing a notification informing the user regarding availability of the content to be presented.

14. At least one non-transitory machine-readable storage device having stored thereon, individually or in combination, instructions that when executed by one or more processors result in the following operations for privacy enforcement, comprising:
establishing an enhanced privacy identifier signed signature and media access control session between a trusted execution environment (TEE) that includes secured memory circuitry and secured processing circuitry and a content provider using communication circuitry;

receiving a message in the TEE from a content provider using the enhanced privacy identifier signed signature and media access control session, the message including content and further including metadata comprising public routing data and encrypted private criteria;

verifying by the TEE that an application to be executed using the TEE is safe to access the secure memory circuitry within the TEE based on a verification of a cryptographic hash measurement of the application and a verification of a signature used to sign the cryptographic hash measurement;

in response to verification that the application is safe to access the secure memory circuitry, executing the application to sanitize first user data to de-identify or uncorrelate the first user data from the user, prior to transmission of the first user data to the content provider;

transferring the received message to the secured memory circuitry of the TEE, wherein the encrypted private criteria include criteria for matching content to the user based on second user data that is not shared external to the TEE;

decrypting the encrypted private criteria via the secured processing circuitry of the TEE;

determining, via the secured processing circuitry and based at least in part on one or more of the decrypted private criteria and user data previously stored via the secured memory circuitry, relevance of the content to a user associated with the user data;

personalize the content based on personalization criteria included in at least a portion of the second user data previously stored in the secured memory circuitry of the TEE; and causing the personalized content to be presented to the user based on the determined relevance.

15. The machine-readable storage device of claim 14, wherein the private criteria comprises dimension matching criteria including instructions for determining the relevance of the content.

16. The machine-readable storage device of claim 14, further comprising instructions that when executed by the one or more processors result in the following operations comprising:
causing additional content to be presented based on counter offer criteria included in the private criteria, the counter offer criteria including instructions for presenting additional content based on the interaction between the user and the presented content.

17. The machine-readable storage device of claim 14, wherein the private criteria comprises feedback criteria including instructions for collecting feedback data based on at least one of the first user data and interaction between the user and the presented content, and further comprising instructions that when executed by the one or more processors result in the following operations comprising:
causing the feedback data to be collected based on the interaction; and
causing the feedback data to be transmitted to at least the content provider.

18. The machine-readable storage device of claim 17, wherein the feedback data comprises at least privacy protected data resulting from the interaction and sanitized user data, and further comprising instructions that when executed by the one or more processors, cause the privacy protected data to be transmitted to the content provider and the sanitized user data to be transmitted to an anonymous data accumulator.

19. The machine-readable storage device of claim 14, further comprising instructions that when executed by the one or more processors result in the following operations comprising:

causing a notification informing the user regarding availability of the content to be presented.

* * * * *

UNITED STATES PATENT AND TRADEMARK OFFICE
CERTIFICATE OF CORRECTION

PATENT NO. : 11,244,068 B2
APPLICATION NO. : 15/039021
DATED : February 8, 2022
INVENTOR(S) : Smith et al.

It is certified that error appears in the above-identified patent and that said Letters Patent is hereby corrected as shown below:

In the Claims

In Column 20, Line 31, in Claim 3, delete "content," and insert --content-- therefor In Column 20, Line 50, in Claim 5, delete "content," and insert --content-- therefor Signed and Sealed this
Fourteenth Day of June, 2022

Katherine Kelly Vidal
*Director of the United States Patent and Trademark Office*